US011570108B2

(12) United States Patent
Zaifman et al.

(10) Patent No.: US 11,570,108 B2
(45) **Date of Patent: *Jan. 31, 2023**

(54) DISTRIBUTION OF NETWORK TRAFFIC TO SOFTWARE DEFINED NETWORK BASED PROBES

(71) Applicant: AT&T Intellectual Property I, L.P., Atlanta, GA (US)

(72) Inventors: Arthur L. Zaifman, Millburn, NJ (US); John M. Mocenigo, Califon, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/176,129

(22) Filed: Feb. 15, 2021

(65) Prior Publication Data

US 2021/0184975 A1 Jun. 17, 2021

Related U.S. Application Data

(63) Continuation of application No. 16/430,285, filed on Jun. 3, 2019, now Pat. No. 10,924,412, which is a (Continued)

(51) Int. Cl.

| | |
|---|---|
| ***H04L 47/125*** | (2022.01) |
| ***H04L 43/0876*** | (2022.01) |
| ***H04L 43/16*** | (2022.01) |
| ***H04L 45/586*** | (2022.01) |
| ***H04L 45/7453*** | (2022.01) |

(52) U.S. Cl.

CPC ........ *H04L 47/125* (2013.01); *H04L 43/0876* (2013.01); *H04L 43/16* (2013.01); *H04L 45/586* (2013.01); *H04L 45/7453* (2013.01)

(58) Field of Classification Search

None

See application file for complete search history.

(56) References Cited

U.S. PATENT DOCUMENTS

| | | | |
|---|---|---|---|
| 7,783,739 | B1 | 8/2010 | Weigle |
| 8,854,972 | B1 | 10/2014 | Li |

(Continued)

OTHER PUBLICATIONS

Kreutz, Diego. "Software-Defined Networking: A Comprehensive Survey". Dated Oct. 8, 2014. pp. 1-61.

(Continued)

*Primary Examiner* — Saad Khawar

(57) ABSTRACT

In one example, a processor may receive network traffic from a demultiplexer via a first network interface card and place portions of the network traffic into a plurality of hash buckets. The processor may further process a first portion of the portions of the network traffic in at least a first hash bucket of the plurality of hash buckets and forward a second portion of the portions of the network traffic in at least a second hash bucket of the plurality of hash buckets to a switch via a second network interface card. In one example, the switch distributes the second portion of the network traffic to one of a plurality of overflow probes. In one example, the plurality of overflow probes comprises a network function virtualization infrastructure for processing the second portion of the network traffic.

20 Claims, 3 Drawing Sheets

Related U.S. Application Data continuation of application No. 15/222,659, filed on Jul. 28, 2016, now Pat. No. 10,313,246.

(56) References Cited

U.S. PATENT DOCUMENTS

| | | | | |
|---|---|---|---|---|
| 9,276,877 | B1 | 3/2016 | Chua et al. | |
| 9,356,956 | B2 | 5/2016 | Kruglick | |
| 10,313,246 | B2 * | 6/2019 | Zaifman | H04L 47/125 |
| 10,924,412 | B2 * | 2/2021 | Zaifman | H04L 45/7453 |
| 2006/0215709 | A1 | 9/2006 | Kuwata | |
| 2010/0036903 | A1 * | 2/2010 | Ahmad | H04L 67/1001<br>709/202 |
| 2012/0198074 | A1 * | 8/2012 | Liaw | H04L 67/1001<br>709/226 |
| 2013/0318243 | A1 | 11/2013 | Chinthalapati et al. | |
| 2014/0317256 | A1 | 10/2014 | Jiang et al. | |
| 2015/0071108 | A1 | 3/2015 | Lumezanu et al. | |
| 2015/0081762 | A1 | 3/2015 | Mason et al. | |
| 2016/0036706 | A1 | 2/2016 | Hiscock et al. | |
| 2016/0050132 | A1 | 2/2016 | Zhang | |
| 2016/0142427 | A1 | 5/2016 | De los Reyes et al. | |
| 2016/0182378 | A1 | 6/2016 | Basavaraja et al. | |
| 2016/0197831 | A1 | 7/2016 | De Foy et al. | |
| 2017/0257276 | A1 | 9/2017 | Chou et al. | |

OTHER PUBLICATIONS

Jammal, Manar. "Software-Defined Networking: State of the Art and Research Challenges". Dated 2014.

* cited by examiner

300

DISTRIBUTION OF NETWORK TRAFFIC TO SOFTWARE DEFINED NETWORK BASED PROBES

This application is a continuation of U.S. patent application Ser. No. 16/430,285, filed Jun. 3, 2019, now U.S. Pat. No. 10,924,412, which is a continuation of U.S. patent application Ser. No. 15/222,659, filed Jul. 28, 2016, now U.S. Pat. No. 10,313,246, all of which are herein incorporated by reference in their entirety.

The present disclosure relates generally to traffic capture and analysis in high speed communication networks, and more particularly to devices, computer-readable media, and methods for forwarding a portion of network traffic to a switch for distribution to an overflow probe comprising network function virtualization infrastructure.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like may be instantiated from the common resource pool.

SUMMARY

In one example, the present disclosure discloses a device, computer-readable medium, and method for forwarding a portion of network traffic to a switch for distribution to an overflow probe comprising network function virtualization infrastructure. For instance, in one example, a processor may receive network traffic from a demultiplexer via a first network interface card and place portions of the network traffic into a plurality of hash buckets. The processor may further process a first portion of the portions of the network traffic in at least a first hash bucket of the plurality of hash buckets and forward a second portion of the portions of the network traffic in at least a second hash bucket of the plurality of hash buckets to a switch via a second network interface card. In one example, the switch distributes the second portion of the network traffic to one of a plurality of overflow probes. In one example, the plurality of overflow probes comprises a network function virtualization infrastructure for processing the second portion of the network traffic.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure bridge the gap between fixed hardware based network analysis infrastructure and software defined network (SDN)-based network analysis infrastructure, e.g., components for network traffic capture, and for security analysis and/or operational analysis of the captured network traffic. It is predicted that data volumes will continue to rise much faster than computing power. Examples of the present disclosure enable a gradual distribution of a network traffic processing workload to new SDN-based computing devices as such devices are brought on-line. In particular, network traffic is gradually and deterministically shared with new SDN-based computing devices via examples of the present disclosure. These and other aspects of the present disclosure are discussed in greater detail below in connection with the examples of FIGS. 1-3.

Figure 1:
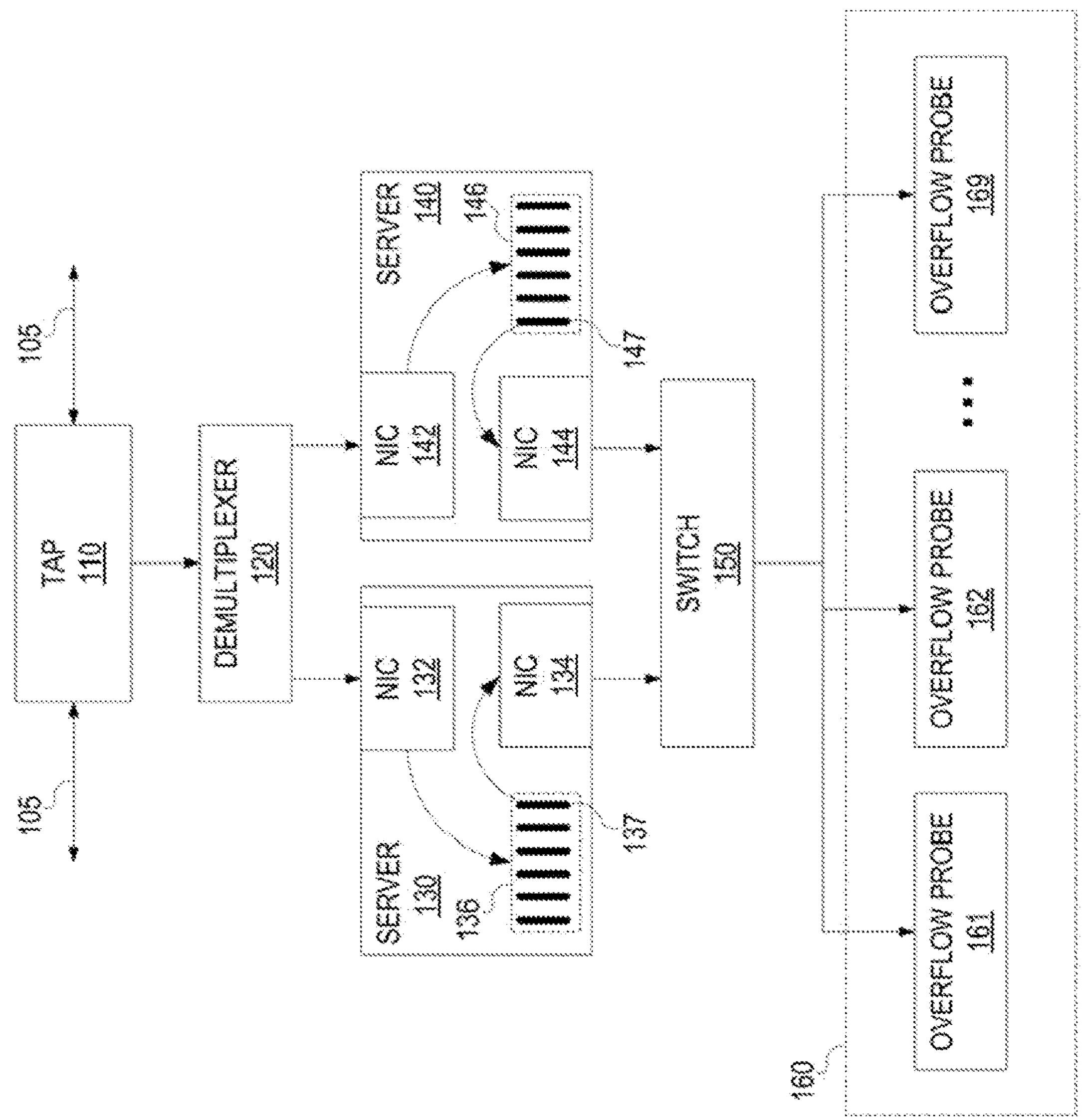
FIG. 1 illustrates an example network or system related to the present disclosure.

To aid in understanding the present disclosure, FIG. 1 illustrates a block diagram depicting one example of a network or system 100 suitable for performing or enabling the steps, functions, operations and/or features described herein. As illustrated in FIG. 1 the system 100 may comprise a portion of a communication network. For instance, the system 100 may reside within a telecommunications service provider network which may include a core network, such as an Internet Protocol/Multi-Protocol Label Switching (MPLS) core network, a cellular core network, such as an evolved packet core (EPC) network, an IP Multimedia Subsystem (IMS) core network, and the like, an access network, a metropolitan area network (MAN), a transport network, and so forth. As illustrated in FIG. 1, the system 100 includes links 105, which may comprise high speed links, e.g., 40-100 gigabits per second (Gb/s) or greater, carrying packetized network traffic, e.g., IP packets.

In one example, tap 110 copies network traffic from the links 105 and forwards the network traffic to demultiplexer 120. In one example, demultiplexer 120 receives the network traffic at a rate which the network traffic is conveyed on links 105 and divides the network traffic into lower rate streams for delivery to a plurality of servers, e.g., including servers 130 and 140. For instance, the demultiplexer 120 may receive the network traffic at 100 Gb/s and divide the network traffic into five 20 Gb/s streams. Thus, in one example, each of servers 130 and 140 may receive a 20 Gb/s stream from demultiplexer 120 via network interface cards 132 and 142, respectively. It should be noted that although two servers 130 and 140 are illustrated in the example of FIG. 1, additional servers may be deployed to receive various streams of the network traffic output by the demultiplexer 120.

In one example, each of the servers 130 and 140 ingests the network traffic (e.g., a respective portion of the network traffic copied from links 105), and places the network traffic into a hash bucket of a hash bucket set (e.g., hash bucket set 136 and hash bucket set 146, respectively). For instance, hash bucket set 136 may comprise a portion of a memory of server 130. Similarly, hash bucket set 146 may comprise a portion of a memory of server 140. In one example, the demutiplexer 120 may provide hash load balancing (HLB) among output streams/servers in which hashing may be based upon IP addresses, or based upon IP addresses and sub-IP address information, such as protocol, application or content types of the network traffic, packet and/or datagram size of the network traffic, and/or ports of the network traffic, e.g., Uniform Datagram Protocol (UDP) or Transmission Control Protocol (TCP) ports. In addition, each of the servers 130 and 140 may allocate packets of the network traffic received to different hash buckets based upon the hash method that is utilized. For instance, hash bucket set 136 and hash bucket set 146 may each include 10 hash buckets, with each hash bucket for receiving 2 Gb/s portions of the network traffic. In a carrier network, e.g., a telecommunications service provider network, the volume of network traffic is such that it can be effectively guaranteed that the network traffic may be uniformly distributed.

In one example, servers 130 and 140 process the network traffic from hash buckets in the hash bucket sets 136 and 146, respectively. In one example, the processing may comprise identifying flows, or packets of flows, and sending the flows to a recording/storage device, generating summary statistics and aggregating network traffic for recording and/or presenting to network management consoles, such as determining link utilization levels, determining the percentages and types of traffic transiting the link, and so forth, performing network security operations, such as monitoring for intrusion detection, unauthorized accesses, and so on.

In one example, server 130 processes at least a first portion of the hash buckets 136, or the packets of the network traffic in the first portion of the hash buckets, while at least a second portion is forwarded to switch 150 via network interface card 134. Similarly, server 140 may process at least a first portion of the hash buckets 146, or the packets of the network traffic in the first portion of the hash buckets, while at least a second portion is forwarded to switch 150 via network interface card 144. In one example, each of servers 130 and 140 is configured with a maximum designated capacity to process at most a first portion of the network traffic in at least a first hash bucket. In one example, the maximum designated capacity may be stated in terms of a number of hash buckets to be processed by the respective server 130 or server 140. In one example, the second portion of the network traffic comprises at least a second hash bucket and is forwarded to the switch 150 when the respective server 130 or server 140 is at the maximum designated capacity. In one example, the maximum designated capacity may be configured to be less than a physical capability of the server 130 and/or the server 140.

In particular, in one example, the system 100 is for migrating network traffic recording, and security and operational monitoring functions from stand-alone and custom hardware to commodity devices comprising network function virtualization infrastructure (NFVI). For instance, in a software defined network (SDN), a controller may instantiate various components on shared hardware (e.g., NFVI/host device(s)) that may be physically located in various data centers or in other locations. Multiple components may be instantiated on a single physical device, or on several devices in a single location, such as in a same data center, or in different locations. In accordance with the present disclosure, NFVI/host device(s) in SDN portion 160 may be configured to function as overflow probes in accordance with the present disclosure. As used herein, the terms “instantiate,” “configure,” and “reconfigure” may refer to programming or loading a computing device with computer-readable/computer-executable instructions, code, and/or programs, e.g., in a memory, which when executed by a processor of the computing device, may cause the computing device to perform various functions. In addition, such terms may comprise provisioning, allocating or assigning other resources of a computing device to a component, such as all or a portion of a memory, an attached data storage unit, and so forth.

In one example, at least a second portion of the network traffic that is forwarded to the switch 150 may comprise at least one hash bucket. For instance, server 130 may forward, at a minimum, contents of hash bucket 137 to the switch 150. Similarly, server 140 may forward, at a minimum, contents of hash bucket 147 to the switch 150. In other words, in one example the maximum designated capacity is not permitted to exceed the number of hash buckets in the plurality of hash buckets, such that at least one hash bucket is always forwarded to the switch 150 by server 130 and/or server 140. In turn, the switch 150 may distribute the portions of the network traffic from hash bucket 137 and hash bucket 147 to one of overflow probes 161, 162, 169, etc. in the SDN portion 160. In one example, overflow probes 161, 162, 169, etc. may process the network traffic (e.g., the portions of the network traffic that are forwarded to the respective overflow probes 161, 162, 169, etc.) in the same or in a similar manner as the processing performed by servers 130 and 140. For instance, overflow probes 161, 162, 169, etc., may store packets of the second portion of the network traffic, generate aggregate link utilization information for a link from which the (second portion of the) network traffic is copied, scan the second portion of the network traffic for security issues, and so forth.

In one example, the maximum designated capacity of server 130 and/or server 140 may be selected based upon a number of overflow probes in SDN portion 160 that are available and the capacities of such overflow probes. Notably, as the SDN portion 160 increases in the amount of NFVI hardware available and as the capacity of SDN portion 160 to add new and/or additional overflow probes increases, the maximum designated capacity of server 130 and/or server 140 may be decreased. Thus, even though server 130 and/or server 140 may have substantial additional capacity, the processing of network traffic may be migrated to the SDN portion 160. In addition, as servers 130 and 140 may have additional spare capacity, servers 130 and 140 may be utilized to process network traffic if and when the ability of SDN portion 160 to handle the processing of the network traffic is diminished. For instance, the availability of overflow probes may fluctuate based on the time of day, day of the week, special events, etc. Thus, the maximum designated capacity of server 130 and/or server 140 may be increased if the number of overflow probes available in SDN portion 160 decreases. Furthermore, as the capacity of SDN portion 160 increases, it is possible to remove or decommission servers, such as servers 130 and 140, from the system 100 and/or from the communication network in which the system 100 is deployed.

It should be noted that the system 100 has been simplified. In other words, the system 100 may be implemented in a different form than that which is illustrated in FIG. 1. For example, the system 100 may be expanded to include other components (not shown) such as additional links, taps, multiplexers, servers, switches, overflow probes, and so forth, without altering the scope of the present disclosure. Similarly, system 100 may omit various elements, substitute elements for components or devices that perform the same or similar functions and/or combine elements that are illustrated as separate components. For instance, FIG. 1 illustrates servers 130 and 140 as forwarding hash buckets/portions of the network traffic to the same switch 150. However, in another example, servers 130 and 140 may forward respective hash buckets/portions of the network traffic to different switches. Likewise, FIG. 1 illustrates one ingress network interface card for each of servers 130 and 140, (network interface cards 132 and 142, respectively). However, in another example, demultiplexer 120 may forward portions of the network traffic to server 130 and/or server 140 via multiple network interface cards per server. Thus, these and other modifications of the system 100 are all contemplated within the scope of the present disclosure.

Figure 2:
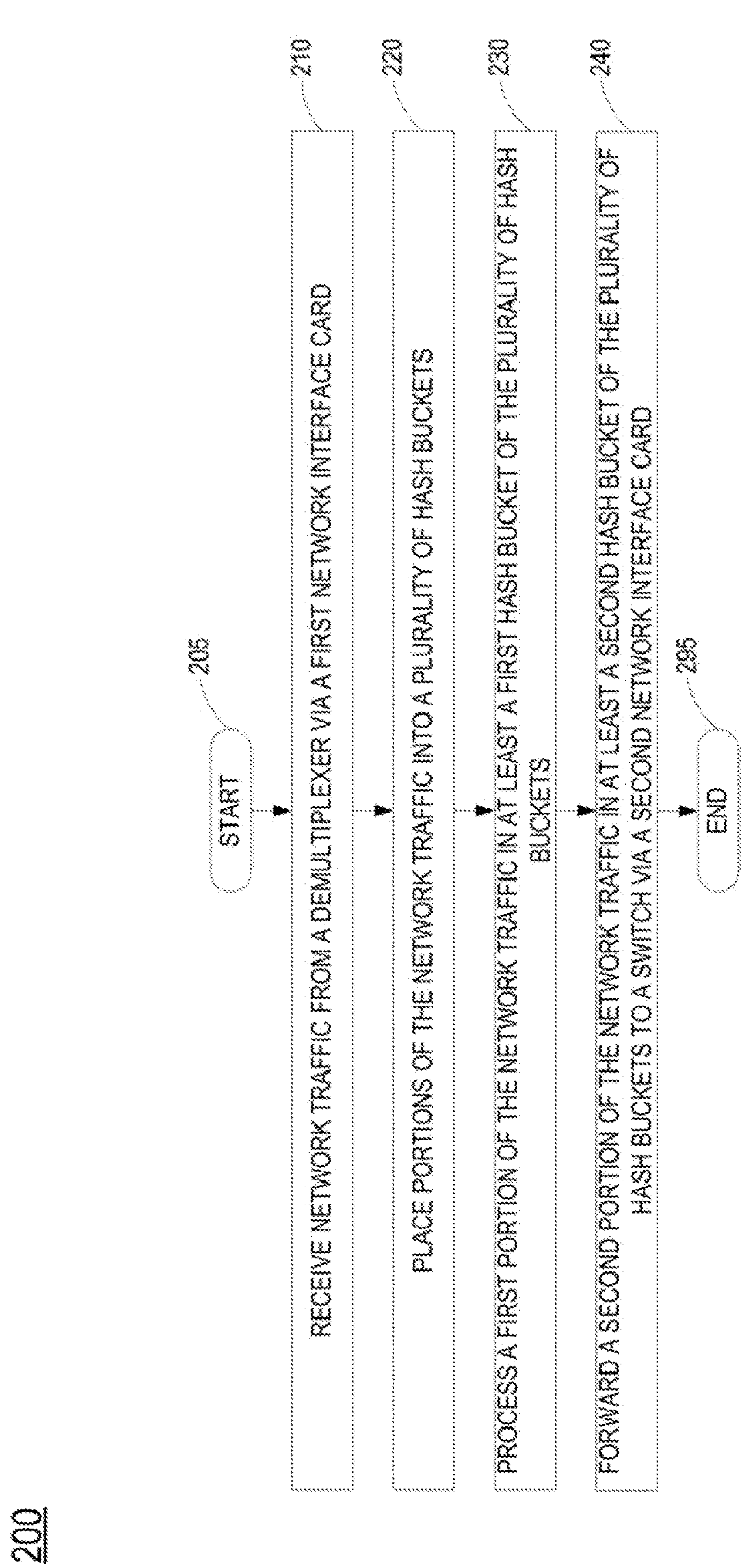
FIG. 2 illustrates a flowchart of an example method forwarding a portion of network traffic to a switch for distribution to an overflow probe comprising network function virtualization infrastructure, in accordance with the present disclosure.

FIG. 2 illustrates a flowchart of an example method 200 for forwarding a portion of network traffic to a switch for distribution to an overflow probe comprising network function virtualization infrastructure, in accordance with the present disclosure. In one example, the steps, functions, or operations of the method 200 may be performed by a server, e.g., broadly a "device," such as server 130 or server 140 in FIG. 1. Alternatively, or in addition, in one example, the steps, functions, or operations of method 200 may be performed by a computing device or system 300, and/or processor 302 as described in connection with FIG. 3 below. For example, the processor 302 and memory 304 may represent the hardware logic and a memory storing computer/hardware logic-executable instructions of an example server, in accordance with the present disclosure. For illustrative purposes, the method 200 is described in greater detail below in connection with an example performed by a processor, such as processor 302 in FIG. 3. The method begins in step 205 and proceeds to step 210.

At step 210, the processor receives network traffic from a demultiplexer via a first network interface card. In one example, the demultiplexer receives the network traffic from a tap for copying the network traffic from a link in a communication network. For instance, the link may comprise at least a 40 Gb/s link. In one example, the demultiplexer receives the network traffic at a same rate at which the network traffic is conveyed on the link and divides the network traffic into lower rate streams for delivery to a plurality of servers, e.g., including a server of the processor performing the method 200. Accordingly, in one example, the network traffic is received from the demultiplexer at less or equal to 20 Gb/s. For instance, the demultiplexer may receive the network traffic at 100 Gb/s and divide the network traffic into five 20 Gb/s streams, may receive the network traffic at 40 Gb/s and divide the network traffic into four 10 Gb/s streams, and so forth. In one example, the demutiplexer may provide hash load balancing (HLB) among output streams/servers in which hashing may be based upon IP addresses, or based upon IP addresses and sub-IP address information, such as protocol, application or content types of the network traffic, packet and/or datagram size of the network traffic, and/or ports of the network traffic.

At step 220, the processor places portions of the network traffic into a plurality of hash buckets. For instance, the processor may allocate packets of the network traffic received to different hash buckets based upon the hash method that is utilized. In one example, the processor may implement a hash bucket set within a memory of a server in which the processor is deployed. For instance, the hash bucket set may include 10 hash buckets with each hash bucket for receiving 2 Gb/s portions of the network traffic.

At step 230, the processor processes a first portion of the network traffic in at least a first hash bucket of the plurality of hash buckets. In one example, the processing comprises storing packets of the first portion of the network traffic, generating aggregate link utilization information for a link from which the network traffic is copied, or scanning the first portion of the network traffic for security issues. In one example, the processor is configured with a maximum designated capacity to process at most the first portion of the network traffic in at least the first hash bucket. In one example, at least the first hash bucket comprises a subset of the set of hash buckets that includes multiple hash buckets. In one example, the maximum designated capacity is stated in terms of a number of hash buckets to be processed by the processor. However, the maximum designated capacity may be less than a physical capability of the processor and/or the server in which the processor is deployed. Alternatively, or in addition, in one example the maximum designated capacity is not permitted to exceed the number of hash buckets in the plurality of hash buckets. In other words, the maximum designated capacity is always exceeded by at least one hash bucket that is considered to be overflow.

At step 240, the processor forwards a second portion of the network traffic in at least a second hash bucket of the plurality of hash buckets to a switch via a second network interface card. For instance, at least the second hash bucket may comprise the overflow that exceeds the maximum designated capacity of the processor performing the method 200 and/or the server in which the processor is deployed. In one example, the switch distributes the second portion of the network traffic to one of a plurality of overflow probes comprising network function virtualization infrastructure (NFVI) for processing the second portion of the network traffic. In one example, the processing of the second portion of the network traffic may comprise the same or substantially similar operations to the processing of the first portion of the network traffic at step 230, e.g., storing packets of the first portion of the network traffic, generating aggregate link utilization information for a link from which the network traffic is copied, scanning the first portion of the network traffic for security issues, and so forth. However, it should be noted that at certain times (e.g., during low network traffic) it is possible that no overflow occurs and that all of the network traffic is processed by the processor at step 230.

In one example, the maximum designated capacity of the processor performing the method 200 and/or the server in which the processor is deployed may be selected based upon a number of overflow probes of the plurality of overflow probes that are available. For instance, when the number of overflow probes of the plurality of overflow probes that are available increases, the maximum designated capacity may be decreased. Accordingly, as the maximum designated capacity is decreased, more and more network traffic may be routed to the SDN-based overflow probes, notwithstanding that the physical capabilities of the processor/server may be able to process a larger volume of the network traffic. As such, processing of network traffic may be migrated to SDN-based components in a controlled and deterministic manner as more and more of the NFVI and SDN infrastructure is made available.

Following step 240, the method 200 proceeds to step 295. At step 295, the method 200 ends.

It should be noted that although not specifically specified, one or more steps, functions or operations of the method 200 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

Figure 3:
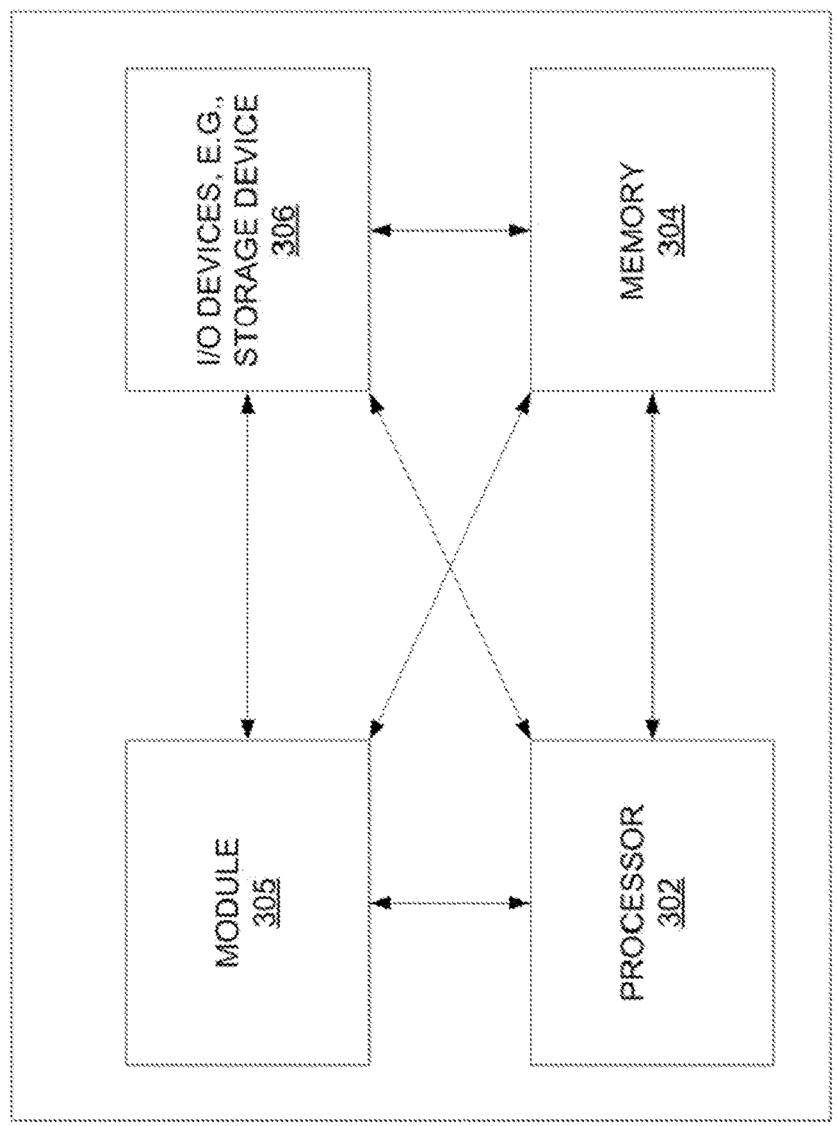
FIG. 3 illustrates an example high-level block diagram of a computer specifically programmed to perform the steps, functions, blocks, and/or operations described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor, hardware logic, and so forth), a memory 304 (e.g., random access memory (RAM) and/or read only memory (ROM)), a module 305 for forwarding a portion of network traffic to a switch for distribution to an overflow probe comprising network function virtualization infrastructure, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device, or any other hardware equivalents, e.g., computer readable instructions pertaining to the methods discussed above can be used to configure a hardware processor to perform the steps, functions and/or operations of the above disclosed method 200. In one example, hardware processor element 302 may function as a server of the present disclosure when used in conjunction with computer/hardware logic-executable code or instructions. For instance, instructions and data for the present module or process 305 for forwarding a portion of network traffic to a switch for distribution to an overflow probe comprising network function virtualization infrastructure (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for forwarding a portion of network traffic to a switch for distribution to an overflow probe comprising network function virtualization infrastructure (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:

a processor; and a computer-readable medium storing instructions which, when executed by the processor, cause the processor to perform operations, the operations comprising:

receiving network traffic;

placing portions of the network traffic into a plurality of hash buckets in a memory;

processing a first portion of the portions of the network traffic in at least a first number of hash buckets of the plurality of hash buckets, wherein the device is configured with a maximum number of hash buckets to process, wherein the maximum number of hash buckets to process is less than a physical processing capability of the device; and forwarding a second portion of the portions of the network traffic in at least a second number of hash buckets of the plurality of hash buckets to a switch, wherein the second portion of the portions of the network traffic comprises an overflow of the network traffic that is in excess of the maximum number of hash buckets to process of the device, wherein the switch distributes the second portion of the portions of the network traffic to at least one of a plurality of overflow probes, wherein the plurality of overflow probes comprises a network function virtualization infrastructure for processing the second portion of the portions of the network traffic.

2. The device of claim 1, wherein the network traffic is received from a tap for copying the network traffic from a link in a communication network.

3. The device of claim 2, wherein the link comprises at least a 40 gigabits per second link, and wherein the network traffic is received at less or equal to 20 gigabits per second.

4. The device of claim 2, wherein the device comprises one of a plurality of devices to receive different network traffic from the link.

5. The device of claim 1, wherein the maximum number of hash buckets is selected based upon a number of overflow probes of the plurality of overflow probes that are available.

6. The device of claim 5, wherein when the number of overflow probes of the plurality of overflow probes that are available increases, the maximum number of hash buckets is decreased.

7. The device of claim 5, wherein the maximum number of hash buckets is not permitted to exceed the number of hash buckets in the plurality of hash buckets.

8. The device of claim 1, wherein the placing the portions of the network traffic into the plurality of hash buckets comprises hash load balancing based upon internet protocol address information of the network traffic.

9. The device of claim 8, wherein the hash load balancing is further based upon sub-internet protocol address information.

10. The device of claim 9, wherein the sub-internet protocol address information comprises:

port numbers of the network traffic;

packet sizes of the network traffic;

datagram sizes of the network traffic; or content types of the network traffic.

11. The device of claim 1, wherein the processing the first portion of the portions of the network traffic comprises:

storing packets of the first portion of the portions of the network traffic;

generating aggregate link utilization information for a link from which the network traffic is copied; or scanning the first portion of the portions of the network traffic for security issues.

12. The device of claim 1, wherein the processing the second portion of the portions of the network traffic comprises:

storing packets of the second portion of the portions of the network traffic;

generating aggregate link utilization information for a link from which the network traffic is copied; or scanning the second portion of the portions of the network traffic for security issues.

13. A non-transitory computer-readable medium storing instructions which, when executed by a processor of a server deployed in a communication network, cause the processor to perform operations, the operations comprising:

receiving network traffic;

placing portions of the network traffic into a plurality of hash buckets in a memory;

processing a first portion of the portions of the network traffic in at least a first number of hash buckets of the plurality of hash buckets, wherein the server is configured with a maximum number of hash buckets to process, wherein the maximum number of hash buckets to process is less than a physical processing capability of the server; and forwarding a second portion of the portions of the network traffic in at least a second number of hash buckets of the plurality of hash buckets to a switch, wherein the second portion of the portions of the network traffic comprises an overflow of the network traffic that is in excess of the maximum number of hash buckets to process of the server, wherein the switch distributes the second portion of the portions of the network traffic to at least one of a plurality of overflow probes, wherein the plurality of overflow probes comprises a network function virtualization infrastructure for processing the second portion of the portions of the network traffic.

14. The non-transitory computer-readable medium of claim 13, wherein the network traffic is received from a tap for copying the network traffic from a link in a communication network.

15. The non-transitory computer-readable medium of claim 14, wherein the link comprises at least a 40 gigabits per second link, and wherein the network traffic is received at less or equal to 20 gigabits per second.

16. The non-transitory computer-readable medium of claim 14, wherein the server comprises one of a plurality of devices to receive different network traffic from the link.

17. The non-transitory computer-readable medium of claim 13, wherein the maximum number of hash buckets is selected based upon a number of overflow probes of the plurality of overflow probes that are available.

18. The non-transitory computer-readable medium of claim 17, wherein when the number of overflow probes of the plurality of overflow probes that are available increases, the maximum number of hash buckets is decreased.

19. The non-transitory computer-readable medium of claim 17, wherein the maximum number of hash buckets is not permitted to exceed the number of hash buckets in the plurality of hash buckets.

20. A method comprising:

receiving, by a processor deployed in a communication network, network traffic;

placing, by the processor, portions of the network traffic into a plurality of hash buckets in a memory;

processing, by the processor, a first portion of the portions of the network traffic in at least a first number of hash buckets of the plurality of hash buckets, wherein the processor is configured with a maximum number of hash buckets to process, wherein the maximum number of hash buckets to process is less than a physical processing capability of the processor; and forwarding, by the processor, a second portion of the portions of the network traffic in at least a second number of hash buckets of the plurality of hash buckets to a switch, wherein the second portion of the portions of the network traffic comprises an overflow of the network traffic that is in excess of the maximum number of hash buckets to process of the processor, wherein the switch distributes the second portion of the portions of the network traffic to at least one of a plurality of overflow probes, wherein the plurality of overflow probes comprises a network function virtualization infrastructure for processing the second portion of the portions of the network traffic.

* * * * *